US012613654B2

(12) United States Patent
Wei et al.

(10) Patent No.: US 12,613,654 B2
(45) Date of Patent: Apr. 28, 2026

(54) AGGREGATING LOG DATA TO A REDUNDANT DIE OF A MEMORY SUB-SYSTEM

(71) Applicant: Micron Technology, Inc., Boise, ID (US)

(72) Inventors: Yue Wei, Shanghai (CN); Dahai Tian, Shanghai (CN); Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/586,861

(22) Filed: Feb. 26, 2024

(65) Prior Publication Data

US 2024/0311040 A1     Sep. 19, 2024

Related U.S. Application Data

(60) Provisional application No. 63/452,745, filed on Mar. 17, 2023.

(51) Int. Cl.
*G06F 3/06* (2006.01)

(52) U.S. Cl.
CPC .......... *G06F 3/0655* (2013.01); *G06F 3/0604* (2013.01); *G06F 3/0676* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692;
(Continued)

(56) References Cited

U.S. PATENT DOCUMENTS

| 7,818,611 | B2 * | 10/2010 | Patel | ................... | G06F 11/1068 |
| | | | | | 714/6.12 |
| 8,832,363 | B1 * | 9/2014 | Sundaram | ............. | G06F 3/0644 |
| | | | | | 714/6.22 |

(Continued)

*Primary Examiner* — Daniel C. Chappell
(74) *Attorney, Agent, or Firm* — Lowenstein Sandler LLP

(57) ABSTRACT

A write operation initiated by a memory sub-system controller of a memory sub-system to write system metadata to one or more of a plurality of dies of the a memory sub-system is identified by a processing device. A redundancy die of a plurality of dies of the memory sub-system is identified. One or more first physical blocks of the redundancy die is identified. A first write operation to write the system metadata to the one or more first physical blocks is performed.

14 Claims, 5 Drawing Sheets

(58) Field of Classification Search
CPC ...... G11C 13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56)                References Cited

U.S. PATENT DOCUMENTS

| | | | |
|---|---|---|---|
| 11,709,601 B2 * | 7/2023 | Wei | G06F 3/0619 |
| | | | 711/154 |
| 2009/0222689 A1 * | 9/2009 | Patel | G11C 29/82 |
| | | | 711/E12.001 |
| 2010/0262755 A1 * | 10/2010 | Becker | G06F 3/0688 |
| | | | 711/E12.001 |
| 2012/0159053 A1 * | 6/2012 | Kano | G06F 3/067 |
| | | | 711/E12.008 |
| 2016/0239226 A1 * | 8/2016 | Sunaga | G06F 3/0688 |
| 2020/0117538 A1 * | 4/2020 | Singidi | G06F 12/0246 |
| 2021/0200461 A1 * | 7/2021 | Muchherla | G06F 3/0604 |
| 2022/0317899 A1 * | 10/2022 | Jeon | G06F 3/065 |
| 2023/0067281 A1 * | 3/2023 | Chen | G06F 3/065 |

* cited by examiner

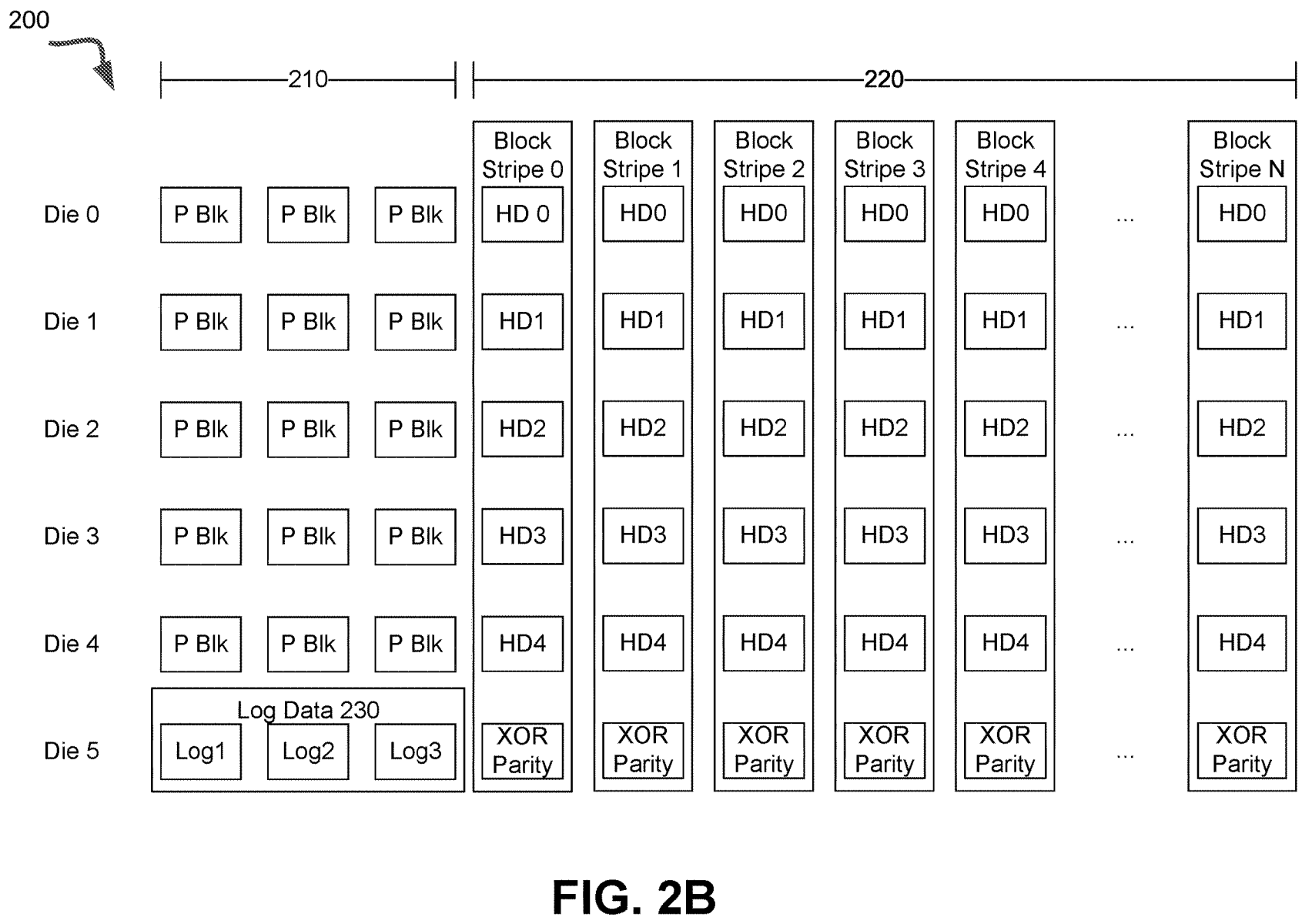

Die 0    Die 1    Die 2    Die 3    Die 4    Die 5

210

| P Blk | P Blk | P Blk |
| P Blk | P Blk | P Blk |
| P Blk | P Blk | P Blk |
| P Blk | P Blk | P Blk |
| P Blk | P Blk | P Blk |

Log Data 230

| Log1 | Log2 | Log3 |

220

| Block Stripe 0 | HD 0 | HD1 | HD2 | HD3 | HD4 | XOR Parity |
| Block Stripe 1 | HD0 | HD1 | HD2 | HD3 | HD4 | XOR Parity |
| Block Stripe 2 | HD0 | HD1 | HD2 | HD3 | HD4 | XOR Parity |
| Block Stripe 3 | HD0 | HD1 | HD2 | HD3 | HD4 | XOR Parity |
| Block Stripe 4 | HD0 | HD1 | HD2 | HD3 | HD4 | XOR Parity |
| Block Stripe N | HD0 | HD1 | HD2 | HD3 | HD4 | XOR Parity |

FIG. 2B

300

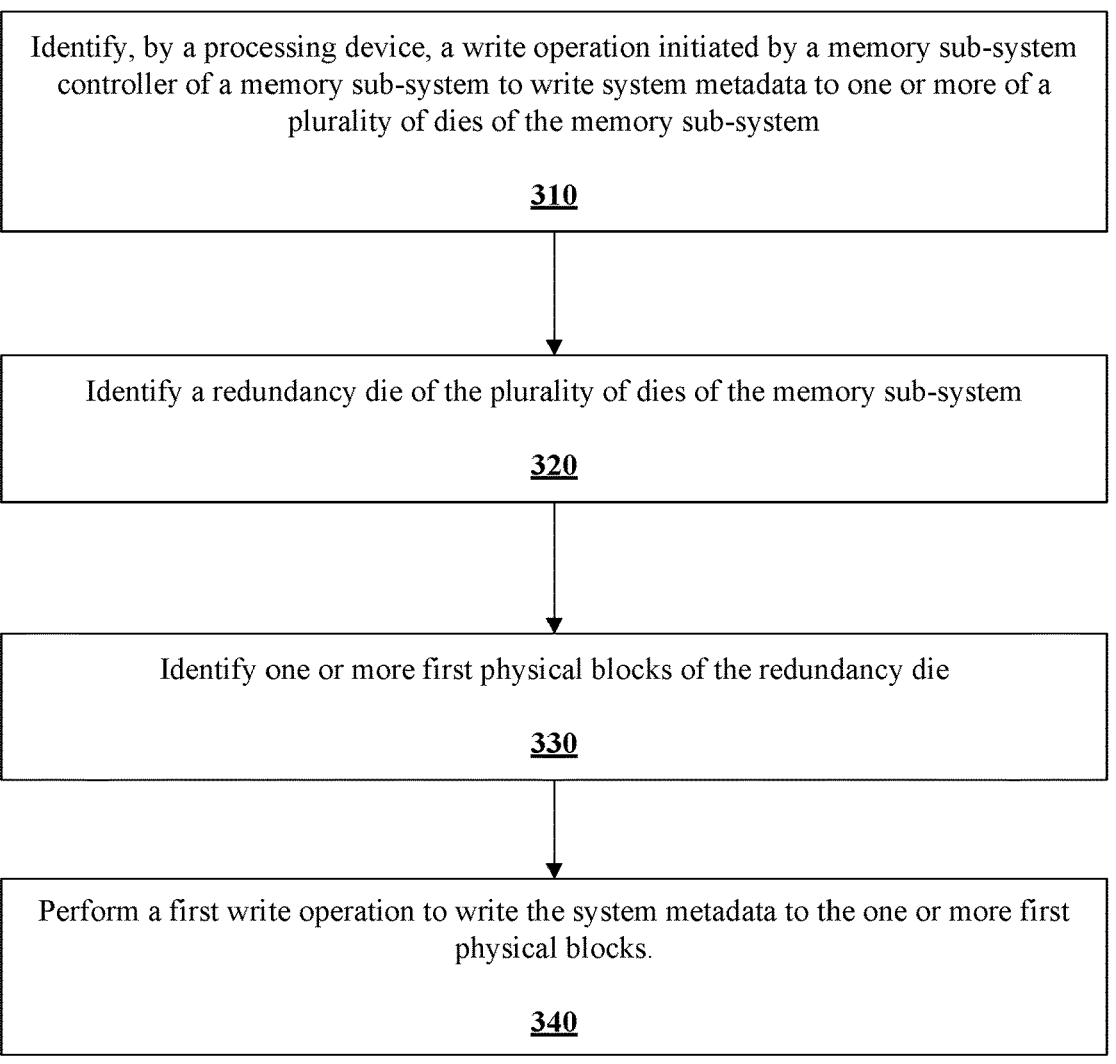

Identify, by a processing device, a write operation initiated by a memory sub-system controller of a memory sub-system to write system metadata to one or more of a plurality of dies of the memory sub-system

310

Identify a redundancy die of the plurality of dies of the memory sub-system

320

Identify one or more first physical blocks of the redundancy die

330

Perform a first write operation to write the system metadata to the one or more first physical blocks.

AGGREGATING LOG DATA TO A REDUNDANT DIE OF A MEMORY SUB-SYSTEM

RELATED APPLICATIONS

This application claims the benefit of U.S. Provisional Patent Application No. 63/452,745, filed Mar. 17, 2023, which is incorporated by reference herein.

TECHNICAL FIELD

Embodiments of the disclosure relate generally to memory sub-systems, and more specifically, relate to aggregating log data to a redundant die of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2A illustrates an example memory sub-system, in accordance with some embodiments of the present disclosure.

FIG. 2B illustrates an example memory sub-system with log data aggregated to a redundant die of the memory sub-system, in accordance with some embodiment of the present disclosure.

FIG. 3 is a flow diagram of an example method to aggregate log data to a redundant die of the memory sub-system, in accordance with some embodiments of the present disclosure.

DETAILED DESCRIPTION

Figure 1:
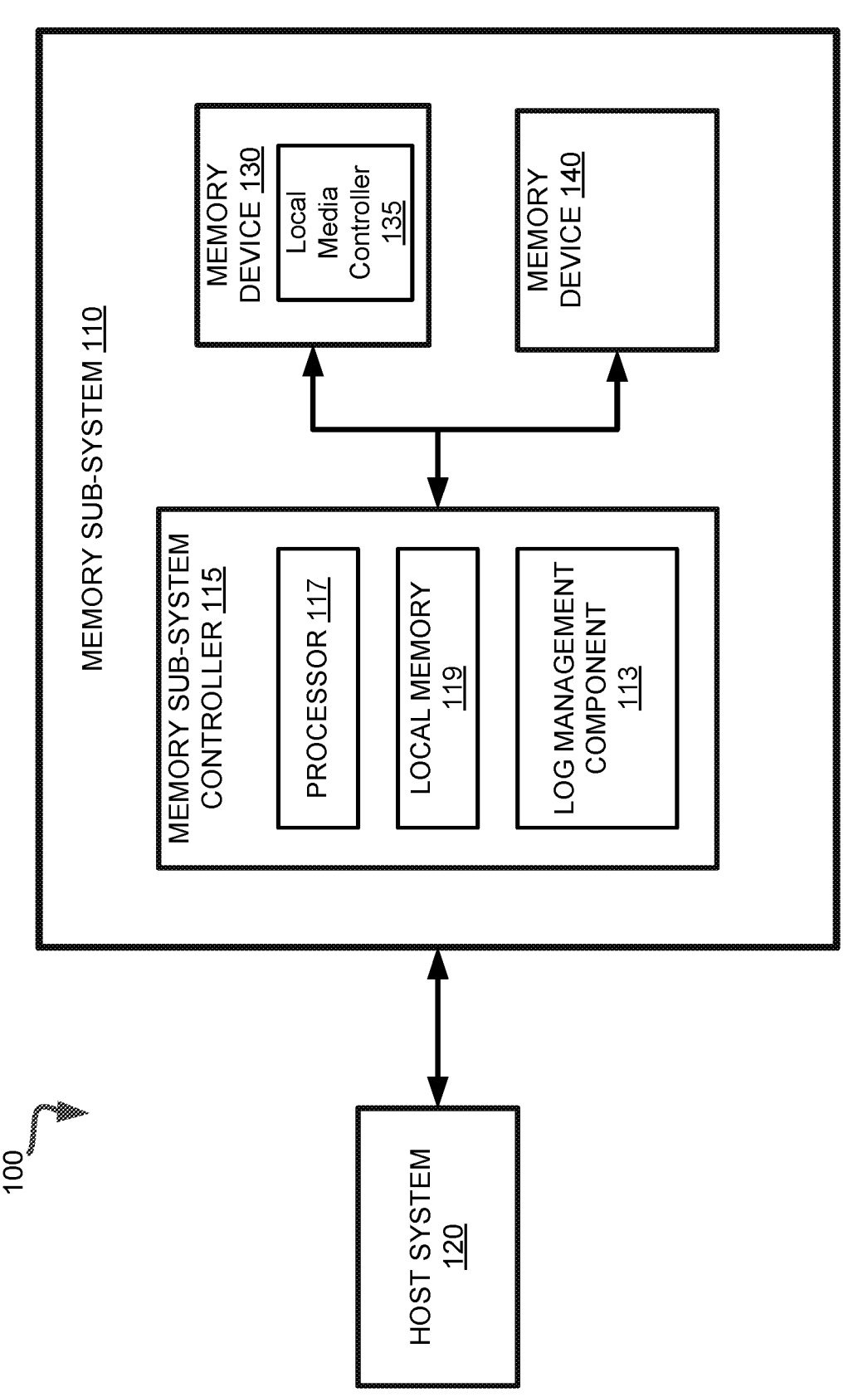
FIG. 1 illustrates an example computing system that includes a memory sub-system in accordance with some embodiments of the present disclosure.

Aspects of the present disclosure are directed to aggregating log data to a redundant die of the memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can includes of one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

Memory access operations can be performed by the memory sub-system. The memory access operations can be host-initiated operations or memory sub-system controller-initiated. For example, the host system can initiate a memory access operation (e.g., write operation, read operation, erase operation, etc.) on a memory sub-system. The host system can send memory access commands (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc. Memory access operations initiated by the memory sub-system controller can relate to maintenance operations, such as garbage collection, wear leveling, bad block management, block refresh operations, etc.

While processing the memory access commands, the memory sub-system can experience quality of service issues, such as latency caused by defects in the memory sub-system software, firmware, and/or hardware. Event data including various data related to the operation of the memory sub-system may be generated in the memory sub-system. An event, as used herein, generally refers to a detectable change of state caused by an action performed by hardware, software, and/or firmware in the memory sub-system. Examples of events include a memory sub-system controller sending and/or receiving data or accessing a memory location of a memory device, a warning related to some reliability statistic (e.g., raw bit error rate (RBER), wear leveling, etc.) of a memory device, an error experienced by the memory sub-system controller in reading data from or writing data to a memory device, garbage collection, encoding and/or decoding, retrieving memory access commands from a queue(s) (e.g., a scheduling queue, a submission queue, etc.), data reconstruction, direct memory access (DMA) operations, media scans, or any other event relating to memory access operations. Data relating to the event (or event data) can include time data (e.g., a timestamp of when execution of the event began, a timestamp of when execution of the event concluded, timer data relating to the duration of executing the event, etc.), metric data (e.g., data relating to metrics used by the memory sub-system), error handling data (e.g., types of error handling operations performed), queueing data, etc.

A memory sub-system controller-initiated write operation may be performed to store a grouping of event data (e.g., log data) to a memory device and facilitate debugging by a host system. Debugging may provide a host system the ability to analyze the log data (such as timestamp data) to determine whether and when latency issues occurred. The memory sub-system controller-initiated write operation may occur during a host-initiated read operation. For example, the memory sub-system may, in response to the host-initiated read operation, may read host data from one or more dies of the memory device. The memory sub-system may receive the memory sub-system controller-initiated write operation, during the host-initiated read operation, to store log data. The die from which the memory sub-system was reading host data may be the same die to which the log data is being stored. Thus, the memory sub-system may delay performance of the host-initiated read operation until the memory sub-system controller-initiated write operation is completed. However, since the host system is unaware of the memory sub-system controller-initiated write operation, the host system experiences read latency that is longer than expected. Some conventional memory sub-systems implement a program suspend feature to prioritize host reads. However, read latency remains longer than expected.

Aspects of the present disclosure address the above and other deficiencies by enabling log data to be programmed to a die (i.e., a memory device) in the memory sub-system without impacting host reads. In one embodiment, the memory sub-system controller identifies a die of a plurality of dies of the memory sub-system (e.g., a redundant die) used to store redundant metadata (e.g., parity data) based on an exclusive-or (XOR) operation with host data. In particular, a portion of the redundant die includes a set of physical blocks (e.g., host physical blocks) reserved for storing host-related data, such as redundant metadata generated for host data stored at similar portions of other dies of the plurality of dies. The memory sub-system controller may use the remaining portion of the redundant die which includes another set of physical blocks not reserved to store host-related data (e.g., non-host physical blocks) to store log data. Accordingly, if a memory sub-system controller-initiated write operation is triggered during a host-initiated read operation, the host-initiated read operation will not be affected by the memory sub-system controller-initiated write operation. In particular, the log data is written to non-host physical blocks on a redundant die which is separate from the one or more dies of the plurality of dies storing host data to be read.

Advantages of the present disclosure include, but are not limited to, improving memory device performance, and more specifically the quality of service during host read operations by avoiding read latency caused by non-host write operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a log management component 113 that can enable log data to be programmed without impacting host reads. In some embodiments, the memory sub-system controller 115 includes at least a portion of the log management component 113. In some embodiments, the log management component 113 is part of the host system 120, an application, or an operating system. In other embodiments, local media controller 135 includes at least a portion of log management component 113 and is configured to perform the functionality described herein.

The log management component 113 can identify a die of a plurality of dies (e.g., a redundant die) used to store redundancy metadata for each fault tolerant stripe (e.g., block stripes, page stripes, etc.) of memory sub-system 110. Redundancy metadata refers to metadata (e.g., parity data) generated for data items programmed to fault tolerant stripes of the memory sub-system 110 and used by memory sub-system controller 115 to recover the data items after a failed memory access operation (e.g., write operation, read operation, etc.) at one or more portions of the fault tolerant stripe.

A fault tolerant stripe refers to a collection of logical memory units (LUNs), such as blocks, pages, etc., across a specific portion (e.g., a specified plane) of a subset of the plurality of dies of memory sub-system 110 (e.g., block stripes, page stripes, etc.) that store data items (e.g., host data). As such, redundancy metadata is generated for each fault tolerant stripe after host data is programmed to a logical unit (e.g., block, page, etc.) associated with the respective fault tolerant stripe and stored at a specified portion (e.g., a specified plane) of the redundancy die associated with the respective fault tolerant stripe.

Portions of each die of the subset of the plurality of dies are designated for non-host data. The portion of each die of the subset of the plurality of dies designated for non-host data does not store the non-host data in fault tolerant stripes. Non-host data can include log data, firmware image, etc. Non-host data is stored directly in physical blocks of portions of each die of the subset designated for non-host data (e.g., non-host physical blocks). Since the redundancy metadata generated for each fault tolerant stripe is stored at a specified portion (e.g., a specified plane) of the redundancy die corresponding to a specific portion of the subset associated with the respective fault tolerant stripe, a portion of the redundancy die remains unused (or undesignated).

The log management component 113 may designate physical blocks of the unused portion of the redundancy die (e.g., non-host redundancy physical blocks) to store log data. In particular, the memory sub-system controller 115 may be triggered to initiate a write operation to store log data to the memory sub-system 110. The log management component 113 may identify one or more physical blocks of the non-host redundancy physical blocks to store log data and store the log data to the one or more physical blocks of the non-host redundancy physical blocks. In some embodiments, the memory sub-system controller 115 may be triggered to initiate the write operation to store log data in response to a special event (e.g., NAND scan). In some embodiments, the memory sub-system controller 115 may be triggered to initiate the write operation to store log data in response to log data (e.g., a collection of event data) stored in a temporary buffer meeting or exceeding a threshold data size causing the log data to be dumped from the temporary buffer and stored into the memory sub-system 110. Therefore, any memory operation initiated by the host system 120 (such as a read operation) is directed to at least one die of the subset of dies storing fault-tolerant stripes. This means that any write operations initiated by the memory sub-system controller 115 for the purpose of storing log data during a memory operation initiated by host system 120 will not affect that operation because the write operations initiated by the memory sub-system controller 115 are carried out on the redundancy die and not on any of the dies of the subset of dies.

Depending on the embodiment, the log management component 113 may designate a grouping of physical blocks of non-host redundancy physical blocks (e.g., main grouping) to store log data. A number of physical blocks of non-host redundancy physical blocks included in the main grouping may be dependent on a threshold data size associated with a temporary buffer used to store log data before being dumped to memory device 130 and/or 140. For example, if each physical block can hold a specific amount of data, the log management component 113 determines a specific amount of blocks necessary to add up to the threshold data size of the temporary buffer. Thus, the main grouping is overwritten during each memory sub-system controller-initiated write operation to store log data. Depending on the embodiment, the log management component 113 may designate additional groupings of physical blocks of the non-host redundancy physical blocks to store different versions (e.g., old version and new version) of the log data and/or copies of the log data (e.g., one or more copies of the log data). Similar to the main grouping, each additional grouping may include the same number of physical blocks of non-host redundancy physical blocks as the main grouping. In other embodiments, the additional grouping may include a different number of physical blocks of non-host redundancy physical blocks. If the additional groupings of physical blocks of the non-host redundancy physical blocks are designated to store different versions of the log data, the log management component 113 may alternate between the main grouping and the additional groupings when storing the log data. If the additional groupings of physical blocks of the non-host redundancy physical blocks are designated to store copies of the log data, the log management component 113 may store in each of the additional groupings a copy of the log data when the log data is store in the main grouping. Further details with regards to the operations of the log management component 113 are described below.

Figure 2A:
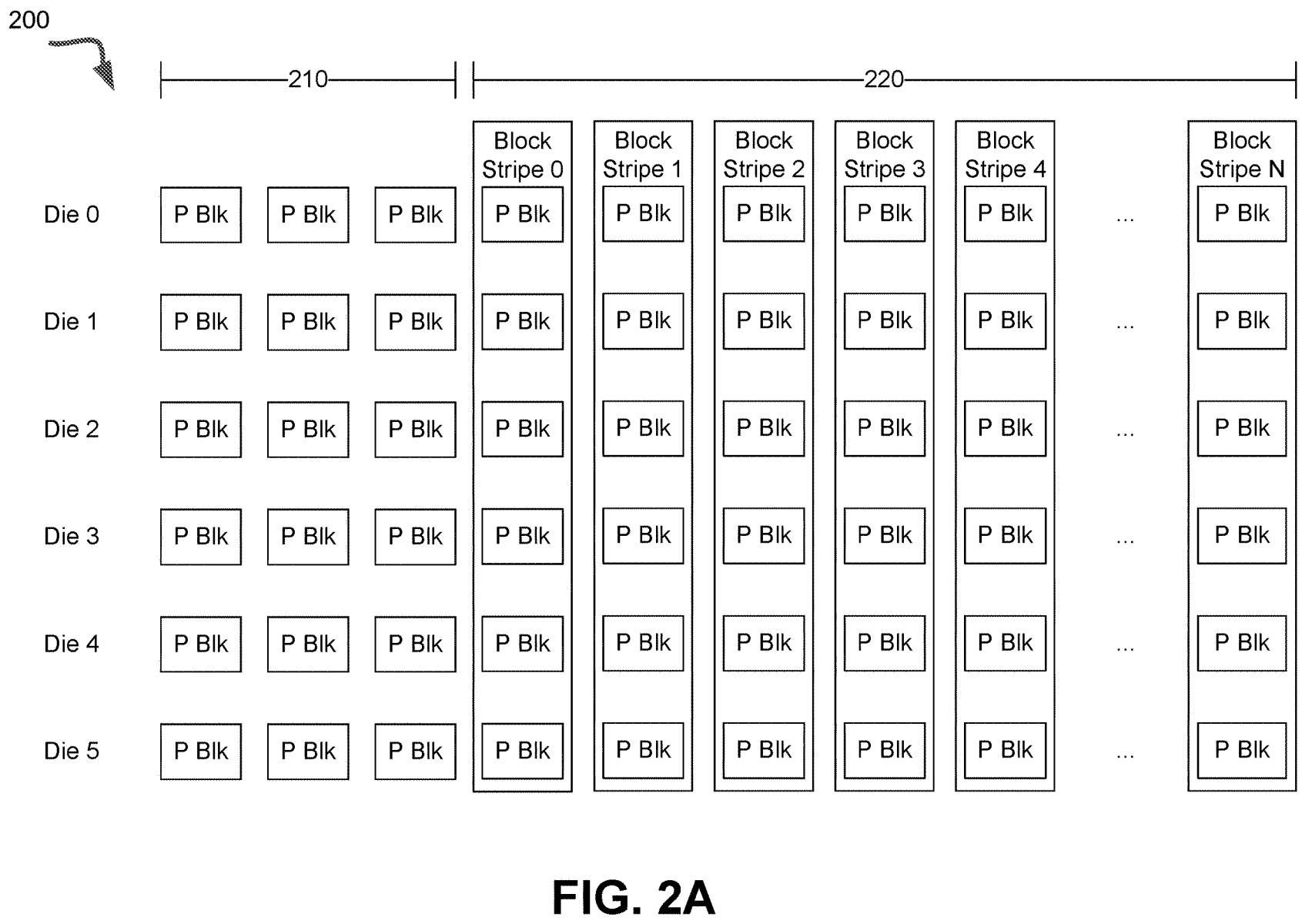

FIG. 2A illustrates an example memory sub-system 200, in accordance with some embodiments of the present disclosure. The memory sub-system 200 includes a plurality of dies (Die 0-5). In some embodiments, a die of the plurality of dies may be designated as a redundant die (e.g., Die 5). The redundant die refers to a die used to store redundancy metadata for fault tolerant stripes of the memory sub-system 200.

Each die of the plurality of dies includes a plurality of physical blocks (e.g., P Blk). A host portion 220 of the memory sub-system 200 may implement fault tolerant stripes across the plurality of dies (e.g., Die 0-5). Each fault tolerant stripe includes a grouping of physical blocks (e.g., P Blks) across of a subset of the plurality of dies (e.g., Die 0-Die 4) storing host data and the redundant die of the plurality of dies (e.g., Die 5) storing redundancy metadata (e.g., XOR parity) associated with the host data.

The remaining physical blocks of the redundant die (e.g., Die 5) within portion 210 of the memory sub-system 200 are designated by the log management component 113 of FIG. 1 to store log data. Referring to FIG. 2B, the memory sub-system controller 115 of FIG. 1 may trigger a write operation to write log data 230 to memory sub-system 200. In some embodiments, the triggered write operation may occur during a read operation initiated by the host system 120. Specifically, the host system 120 may initiate a read operation that reads host data (HD1-4) from one or more fault-tolerant stripes (e.g., block stripes 0-N), which results in host data being read from Die 0-Die 4. Prior to the completion of the read operation, the memory sub-system controller 115 triggers a write operation to store log data (e.g., log data 230). Consequently, each portion of log data 230 (e.g., log 1-log 3) is written to one of the remaining physical blocks of the redundant die (e.g., Die 5) within portion 210 of the memory sub-system, which results in log data (e.g., log data 230) being written to Die 5 and not impacting any read operations performed on Die 0-Die 4.

FIG. 3 is a flow diagram of an example method 300 to aggregate log data to a redundant die of a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the log management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic identifies a write operation initiated by a memory sub-system controller of a memory sub-system (e.g., memory sub-system 200 of FIG. 2B) to write system metadata (e.g., log data 230) to one or more of a plurality of dies of the memory sub-system (e.g., Die 0-5 of FIG. 2B). In some embodiments, the write operation may be initiated in response to system metadata stored in a temporary buffer satisfying (e.g., meeting or exceeding) a threshold data size causing the system metadata to be dumped from the temporary buffer and stored into the memory sub-system. In some embodiments, the write operation may be initiated in response to a special event (e.g., NAND scan). In some embodiments, system metadata may be a series of event data collectively identified as log data.

At operation 320, the processing logic identifies a redundancy die of the plurality of dies of the memory sub-system (e.g., Die 5 of FIG. 2B). The redundancy die of the plurality of dies may include a first set of physical blocks (e.g., portion 220 of FIG. 2B) and a second set of physical blocks (e.g., portion 210 of FIG. 2B). The first set of physical blocks of the redundancy die (e.g., host redundancy physical blocks) may be designated to store redundancy metadata associated with host data stored in the remaining dies of the plurality of dies. As previously described, the one or more remaining dies of the plurality of dies are designated to store host data. The second set of physical blocks (e.g., non-host redundancy physical blocks) may be designated to store system metadata.

At operation 330, the processing logic identifies one or more first physical blocks of the redundancy die (e.g., P Blks of Die 5, as shown in FIG. 2B). In some embodiments, a specific number of first physical blocks may be selected as the one or more first physical blocks based a total size of the system metadata and a size of each first physical block. The one or more first physical blocks may belong to the second set of physical blocks of the redundancy die.

At operation 340, the processing logic performs a first write operation to write the system metadata to the one or more first physical blocks (i.e., Log 1-3 of log data 230 written to portion 210 of Die 5, as shown in FIG. 2B). Depending on the embodiment, the processing logic identifies one or more second physical blocks of the redundancy die to perform a second write operation to write a copy of the system metadata. The one or more second physical blocks may belong to the second set of physical blocks.

Figure 4:
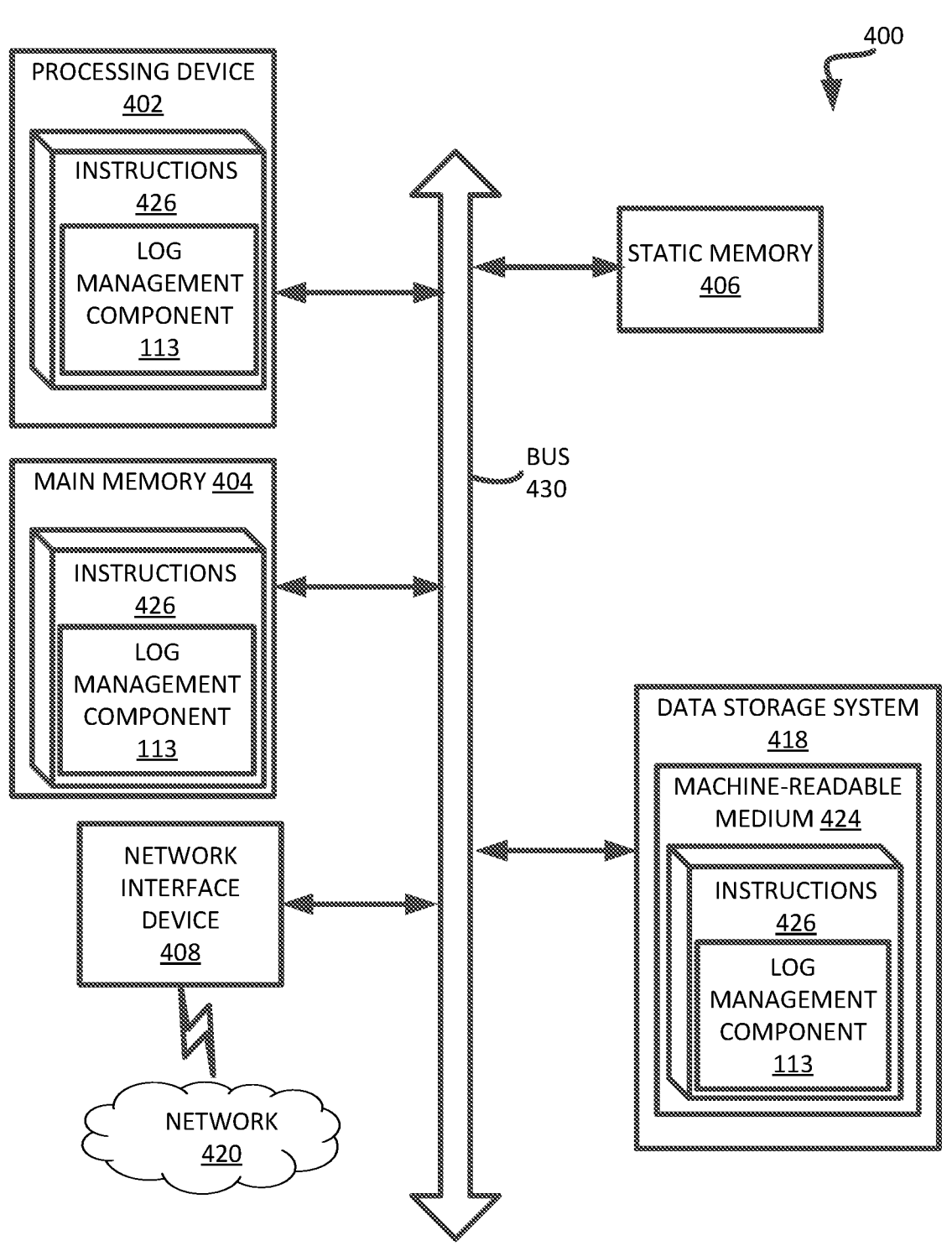
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the log management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a log management component (e.g., the log management component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

identifying, by a processing device, a write operation initiated by a memory sub-system controller of a memory sub-system to write system metadata to one or more of a plurality of dies of the memory sub-system, wherein the system metadata comprises a series of event data collectively identified as log data;

identifying a redundancy die of the plurality of dies of the memory sub-system used other A to store redundancy metadata associated with host data, wherein one or more other dies of the plurality of dies of the memory sub-system are designated to store host data;

identifying one or more first physical blocks of the redundancy die; and performing the write operation by the memory sub-system controller to write the system metadata to the one or more first physical blocks of the redundancy die.

2. The method of claim 1, wherein a first set of physical blocks of the redundancy die is designated to store redundancy metadata associated with host data stored in remaining dies of the plurality of dies.

3. The method of claim 2, wherein the one or more first physical blocks belong to a second set of physical blocks of the redundancy die, wherein the second set of physical blocks is designated to store system metadata.

4. The method of claim 1, further comprising:
    identifying one or more second physical blocks of the redundancy die; and
    performing a second write operation to write a copy of the system metadata to the one or more second physical blocks of the redundancy die.

5. The method of claim 1, wherein a specific number of first physical blocks are selected as the one or more first physical blocks based a total size of the system metadata and a size of each first physical block.

6. A system comprising:
    one or more memory devices; and
    a processing device, coupled to the one or more memory devices, to perform operations comprising:
        identifying, by a processing device, a write operation initiated by a memory sub-system controller of a memory sub-system to write system metadata to one or more of a plurality of dies of the memory sub-system, wherein the system metadata comprises a series of event data collectively identified as log data;
        identifying a redundancy die of the plurality of dies of the memory sub-system used to store redundancy metadata associated with host data, wherein one or more other dies of the plurality of dies of the memory sub-system are designated to store host data;
        identifying one or more first physical blocks of the redundancy die; and
        performing the write operation by the memory sub-system controller to write the system metadata to the one or more first physical blocks of the redundancy die.

7. The system of claim 6, wherein a first set of physical blocks of the redundancy die is designated to store redundancy metadata associated with host data stored in remaining dies of the plurality of dies.

8. The system of claim 7, wherein the one or more first physical blocks belong to a second set of physical blocks of the redundancy die, wherein the second set of physical blocks is designated to store system metadata.

9. The system of claim 6, wherein the processing device is to perform operations further comprising:
    identifying one or more second physical blocks of the redundancy die; and
    performing a second write operation to write a copy of the system metadata to the one or more second physical blocks of the redundancy die.

10. The system of claim 6, wherein a specific number of first physical blocks are selected as the one or more first physical blocks based a total size of the system metadata and a size of each first physical block.

11. A non-transitory computer-readable storage medium comprising instructions that, when executed by a processing device, cause the processing device to perform operations comprising:
    identifying, by a processing device, a write operation initiated by a memory sub-system controller of a memory sub-system to write system metadata to one or more of a plurality of dies of the memory sub-system, wherein the system metadata comprises a series of event data collectively identified as log data;
    identifying a redundancy die of the plurality of dies of the memory sub-system used to store redundancy metadata associated with host data, wherein one or more other dies of the plurality of dies of the memory sub-system are designated to store host data;
    identifying one or more first physical blocks of the redundancy die; and
    performing the write operation by the memory sub-system controller to write the system metadata to the one or more first physical blocks of the redundancy die.

12. The non-transitory computer-readable storage medium of claim 11, wherein a first set of physical blocks of the redundancy die is designated to store redundancy metadata associated with host data stored in remaining dies of the plurality of dies.

13. The non-transitory computer-readable storage medium of claim 12, wherein the one or more first physical blocks belong to a second set of physical blocks of the redundancy die, wherein the second set of physical blocks is designated to store system metadata.

14. The non-transitory computer-readable storage medium of claim 11, wherein a specific number of first physical blocks are selected as the one or more first physical blocks based a total size of the system metadata and a size of each first physical block.

* * * * *